April 29, 1958 J. JOHNSON 2,832,187
CONVEYOR ATTACHMENT FOR HARVESTER PLATFORMS
Filed Dec. 28, 1956 2 Sheets-Sheet 1

INVENTOR.
JOHN JOHNSON
BY
McMorrow, Berman & Davidson
ATTORNEYS

April 29, 1958  J. JOHNSON  2,832,187
CONVEYOR ATTACHMENT FOR HARVESTER PLATFORMS
Filed Dec. 28, 1956  2 Sheets-Sheet 2

INVENTOR.
JOHN JOHNSON
BY
McMorrow, Berman + Davidson
ATTORNEYS

United States Patent Office 2,832,187
Patented Apr. 29, 1958

2,832,187

CONVEYOR ATTACHMENT FOR HARVESTER PLATFORMS

John Johnson, Brockton, Mont.

Application December 28, 1956, Serial No. 631,220

2 Claims. (Cl. 56—207)

This invention relates to improved conveyor mechanism for harvester platforms, involving suction means for assisting in moving cut grain stalks and the like from the cutter assemblies to the conveyor assemblies thereof.

Harvester platforms with their accompanying appurtenances perform the function of cutting grain standing in a field and thereafter delivering the same from the platform to suitable conveying structure, for example, conveying the same away from the platform. Relatively short stalks of grain are at times dropped by the cutter assembly of the harvester platform and are lost in the field, because they may be too short to reach the conveyor assembly to be taken up thereby.

A primary object of the invention is to provide suction means between the cutter assembly and the conveyor assembly of a harvester which takes up and passes on the short stalks of grain or the like cut by the cutter assembly to the conveyor assembly, thereby eliminating or reducing the losses mentioned.

Another object of the invention is to provide a suction attachment which can be installed on harvester platforms incorporating a transverse cutter assembly and a substantially parallel conveyor assembly of any suitable character therebehind, said attachment being disposed between the cutter assembly and the conveyor assembly for conveying grain stalks ordinarily lost after being cut and moving the same from the cutter assembly to the conveyor assembly.

A further object of the invention is to provide a suction attachment of the character indicated which can be readily and economically manufactured, easily installed, and which is highly satisfactory and practical for the purpose intended.

These together with other objects and advantages which will subsequently become apparent herein reside in the details of construction and operation as more fully hereinafter described and claimed, reference being had to the accompanying drawings forming a part hereof, wherein like numerals refer to like parts throughout, and in which:

Figure 1:
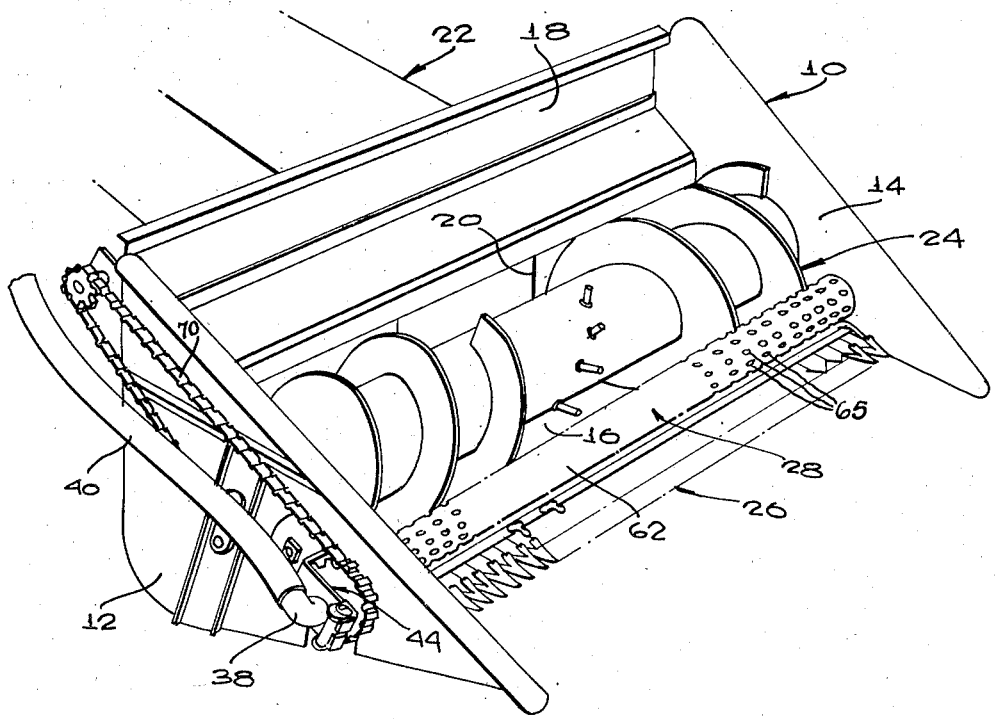
Figure 1 is a front perspective view of a harvester platform incorporating the novel conveyor attachment thereon.
Figure 2:
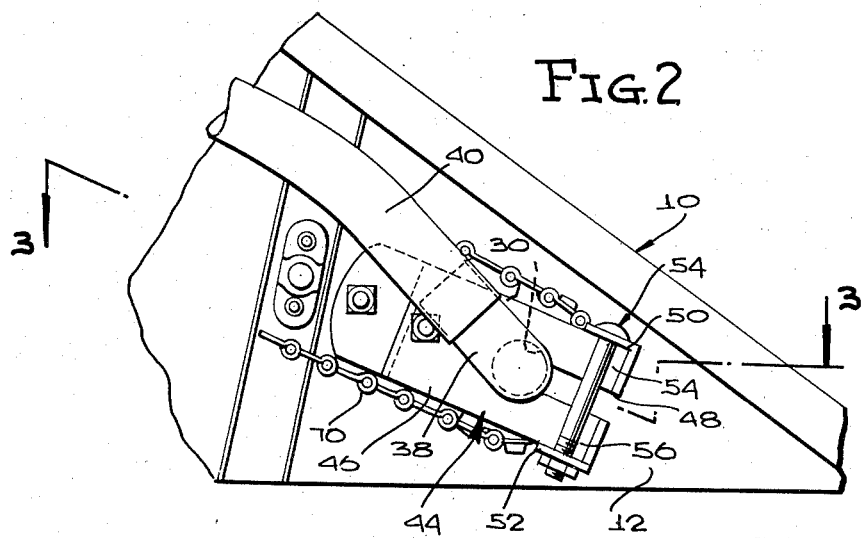
Figure 2 is an enlarged fragmentary side elevation of Figure 1.

Referring to the drawing in detail, indicated generally at 10 is a harvester platform conventionally incorporating a pair of mutually parallel substantially triangular shaped side plates 12 and 14 on the ends of a rearwardly inclined floor or bottom wall 16, which extends rearwardly to a vertically extending rear wall 18, said rear wall having extending therethrough a suitable aperture portion 20 through which a suitable belt conveyor, indicated generally by phantom lines at 22 extends, said conveyor being of the endless canvas draper type, for example. Indicated generally at 24 is a rotary conveyor assembly, such as an "auger" type, said conveyor assembly being operatively associated with the upper surface of the floor 16 of the harvester platform, opposite ends of the auger being suitably journalled on the side plates 12 and 14, as is conventional. In this regard, although an "auger" type conveyor has been disclosed in the exemplary embodiment, a suction attachment in accordance with the present invention can be readily used on harvesters having instead a conventional rotatable crop engaging reel. Suitably secured in transversely extending relationship on the leading or forward edge of the floor 14 of the harvester platform is a cutter assembly, indicated generally at 26, which as shown, may be of the "sickle" type, and as in the case of the conveyor assembly 24, the cutter assembly 26 may be of any character conventionally found in harvesters of the types here contemplated. The aforementioned structure is conventional, and accordingly, although not shown, the side plates 12 and 14 may have suitably secured on the lower edges thereof conventional support shoes.

The illustrated suction attachment, generally designated 28, comprises an elongated tubular support shaft 30 extending between the side plates 12 and 14, and between and parallel spaced from the cutter assembly 26 and the conveyor assembly 24. The end 33 of the tubular member or shaft 30 adjacent to the side plate 14 has therein a solid plug 32 and the plug 32 incorporates an axial threaded stud 34 which extends through a suitable bearing 36 fixedly secured in an aperture 35 in the side plate 14, as clearly seen in Figure 3.

The tubular shaft 30 has on its opposite end an elbow 38 which receives thereon a suitably secured flexible hose 40 which is in communication with a suction creating source (not shown). The side wall 37 of the tubular shaft 30 has extending longitudinally thereof for substantially the entire length thereof a slot 42 opening toward or facing the cutter assembly 26 for applying suction to the region of the forward part of the floor 16 of the harvester platform behind the cutter assembly 26.

Suitably secured on the outer surface of the side plate 12 is a suitably supported laterally extending support bracket assembly indicated generally at 44, incorporating a plate portion 46 having an opening 47 through which a related portion of the tubular shaft 30 extends. The plate portion 46 is spaced outwardly from the side plate 12 and has a longitudinal slot 48 opening through the forward end in communication with the aperture 47. Extending laterally from upper and lower edges of the plate 46 on opposite sides of the slot 48 are ears 50 and 52 which have extending therethrough an adjusting nut and bolt assembly, indicated generally at 54, for adjusting the clamping engagement of respective upper and lower portions 54 and 56 of the plate 46 with the related portion of the shaft 30. By loosening the nut 60 of the nut and bolt assembly 54 and the nut element 60 on the externally threaded stud 34 of the plug 32, the tubular shaft 30 may be rotated about its axis for adjusting the position of the suction slot 42 relative to the cutter assembly 26 for obtaining the most desirable action of the suction for picking up short stalks of grain cut by the assembly 26, and which is normally lost in front of the cutter assembly 26 by its failure to be reached by the conveyor assembly 24.

Circumposed on and journaled on the tubular shaft 30 is a perforated rotatable sleeve 62, having an end 63 extending through a suitable aperture 64 in the side plate 12. A sprocket wheel 66 is circumposed on the sleeve 62 outwardly of the side plate 12 and is retained thereon by means of a set screw 68. The sprocket wheel 66 has trained thereon a suitable drive chain 70 operatively connected to suitable means (not shown) for driving the chain. The side wall 69 of the sleeve 62 has therein longitudinal rows of perforations 65.

Figure 3:
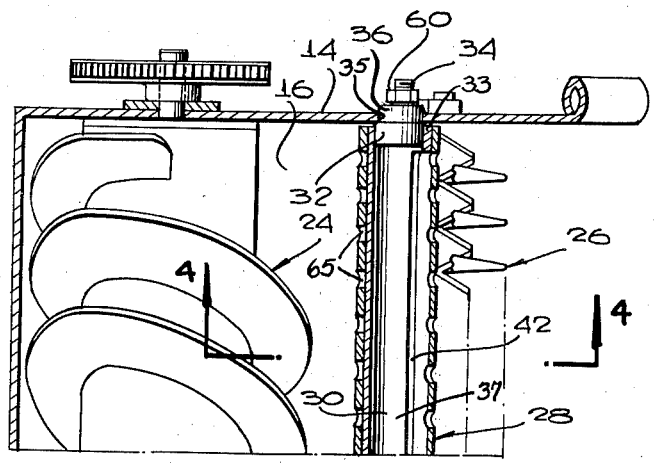
Figure 3 is a contracted and fragmentary horizontal section taken on the line 3—3 of Figure 2.
Figure 4:
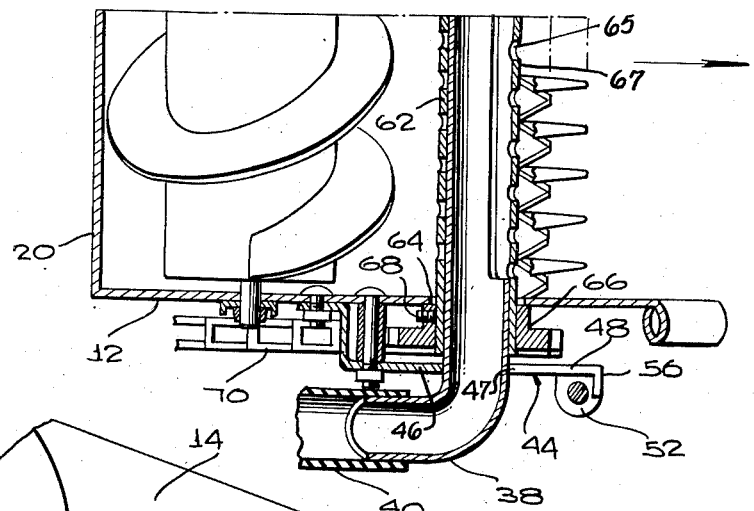
Figure 4 is an enlarged fragmentary vertical longitudinal section taken substantially on the plane of line 4—4 of Figure 3.
Figure 4:
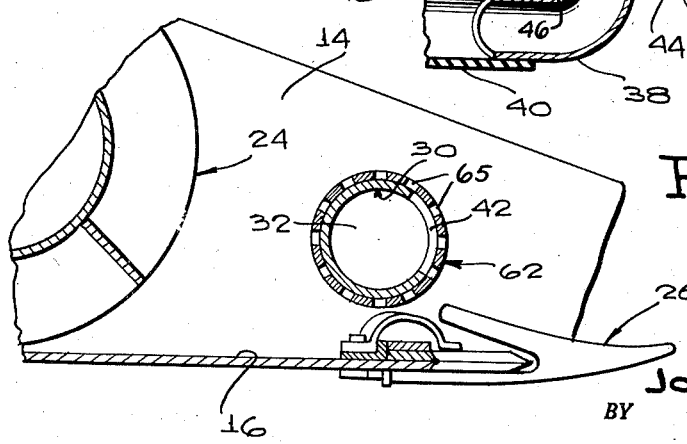

Considering Figure 3, as the harvester platform moves forwardly in the direction indicated by the direction arrow in Figure 3, grain being cut at its butt end by the cutter assembly 26 will normally fall onto the upper surface of the floor 16 of the harvester platform, but relatively short stalks of grain which normally would fall forward onto the ground and fail to reach the conveyor assembly 24, are drawn toward the suction attachment 28, the slot 42 of the tubular shaft 30 being intermittently uncovered due to rotation of the perforated sleeve 62. The short stalks of grain will be drawn onto the outer surface of the rotating tubular sleeve 62 and as the sleeve rotates, such short stalks, will be cast upon the floor 16 in front of the conveyor assembly 24 and will be picked up by the conveyor assembly 24 and conveyed to the belt 22.

The suction attachment 28 may be utilized with harvesters of any character, for example, in hay choppers, harvester threshers, etc. The attachment 28 also performs the function of tending to cut down excessive dust, chaff, etc. accumulating in front of the harvester, which generally causes discomfort to an operator and impairs his vision.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed as new is as follows:

1. In a harvester platform, a rearwardly inclined floor having a forward edge and a rear edge, vertical side plates on the opposite ends of said platform and rising above said floor, a rear wall rising from the rear edge of said platform, a cutter assembly extending along the floor forward edge, a horizontally disposed rotary conveyor assembly positioned between said side walls forwardly of and adjacent said rear wall and spaced above said floor, and a horizontally disposed conveyor mechanism positioned forwardly of and in parallel spaced relation with respect to said conveyor assembly, said mechanism including a hollow tubular member open at one end and closed at the other end, said member extending from one of said side plates to the other of said side plates and being fixedly supported in said side plates, there being a slot in said member between the open and closed ends thereof and facing toward said cutter assembly, a perforated sleeve circumposed about said member and rotatable about said member as an axis, and means on the open end of said member for attachment of a source of suction thereto.

2. In a harvester platform, a rearwardly inclined floor having a forward edge and a rear edge, vertical side plates on the opposite ends of said platform and rising above said floor, a rear wall rising from the rear edge of said platform, a cutter assembly extending along the floor forward edge, a horizontally disposed rotary conveyor assembly positioned between said side walls forwardly of and adjacent said rear wall and spaced above said floor, and a horizontally disposed conveyor mechanism positioned forwardly of and in parallel spaced relation with respect to said conveyor assembly, said mechanism including a hollow tubular member open at one end and closed at the other end, said member extending from one of said side plates to the other of said side plates and being fixedly supported in said side plates, there being a slot in said member between the open and closed ends thereof and facing toward said cutter assembly, a perforated sleeve circumposed about said member and rotatable about said member as an axis, an elbow exteriorly of the side wall adjacent the open end of said shaft and having one leg connected in communication with the open end of said member, and a source of suction connected to the other leg of said elbow.

References Cited in the file of this patent

UNITED STATES PATENTS

| 1,269,742 | Rhodes | June 18, 1918 |
| 1,365,503 | Kocher | Jan. 11, 1921 |